(12) United States Patent
Doujou et al.

(10) Patent No.: US 12,546,973 B2
(45) Date of Patent: Feb. 10, 2026

(54) OPTICAL SYSTEM, IMAGE PICKUP APPARATUS, IN-VEHICLE SYSTEM, AND MOVING APPARATUS

(71) Applicant: CANON KABUSHIKI KAISHA, Tokyo (JP)

(72) Inventors: Naoto Doujou, Tochigi (JP); Kazuhiko Kajiyama, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 629 days.

(21) Appl. No.: 17/823,023

(22) Filed: Aug. 29, 2022

(65) Prior Publication Data

US 2023/0080794 A1  Mar. 16, 2023

(30) Foreign Application Priority Data

Sep. 3, 2021 (JP) .................. 2021-143924

(51) Int. Cl.
| | | |
|---|---|---|
| G02B 9/08 | (2006.01) |
| G02B 6/293 | (2006.01) |
| G02B 9/04 | (2006.01) |
| G06T 7/55 | (2017.01) |
| G02B 5/00 | (2006.01) |
| G02B 13/18 | (2006.01) |

(52) U.S. Cl.
CPC ............ G02B 9/04 (2013.01); G02B 6/29367 (2013.01); G02B 9/08 (2013.01); G06T 7/55 (2017.01); *G02B 5/005* (2013.01); *G02B 13/18* (2013.01); *G06T 2207/30261* (2013.01)

(58) Field of Classification Search
CPC ... G02B 9/00; G02B 9/04; G02B 9/08; G02B 9/12; G02B 9/14; G02B 9/24; G02B 9/26; G02B 9/28; G02B 13/00; G02B 13/001; G02B 13/0015; G02B 13/002; G02B 13/003; G02B 13/006; G02B 13/008; G02B 13/14
USPC .................................. 359/713–716, 738–740
See application file for complete search history.

(56) References Cited

U.S. PATENT DOCUMENTS

| | | | | |
|---|---|---|---|---|
| 6,115,188 | A * | 9/2000 | Nishio ........... | G02B 15/143105 |
| | | | | 359/557 |
| 8,526,124 | B2 * | 9/2013 | Maetaki ................. | G02B 13/18 |
| | | | | 359/716 |
| 9,848,112 | B2 * | 12/2017 | Piekniewski .......... | G06V 20/56 |
| 12,044,831 | B2 * | 7/2024 | Doujou ..................... | G02B 9/62 |
| 2013/0155527 | A1 | 6/2013 | Yoneyama | |
| 2021/0088762 | A1 * | 3/2021 | Saito ..................... | G02B 13/04 |
| 2022/0187568 | A1 * | 6/2022 | Inukai ................ | G02B 13/0045 |

FOREIGN PATENT DOCUMENTS

| | | |
|---|---|---|
| CN | 208805604 U | 4/2019 |
| JP | H04218012 A | 8/1992 |
| JP | H06501792 A | 2/1994 |

(Continued)

*Primary Examiner* — Thong Q Nguyen
(74) *Attorney, Agent, or Firm* — Canon U.S.A., Inc. IP Divison

(57) ABSTRACT

A system includes an aperture diaphragm, a first lens configured to be disposed next to the aperture diaphragm on an object side, and to include one or more positive lenses and one or more negative lenses, and a second lens configured to be disposed next to the aperture diaphragm on an image side, and to include one or more positive lenses and one or more negative lenses. Predetermined conditions are satisfied.

13 Claims, 11 Drawing Sheets

(56) References Cited

FOREIGN PATENT DOCUMENTS

| | | |
|---|---|---|
| JP | H07218831 A | 8/1995 |
| JP | H10307255 A | 11/1998 |
| JP | 2001075008 A | 3/2001 |
| JP | 2004102162 A | 4/2004 |
| JP | 2004333572 A | 11/2004 |
| JP | 2005134870 A | 5/2005 |
| JP | 2005157279 A | 6/2005 |
| JP | 2006330341 A | 12/2006 |
| JP | 2007127694 A | 5/2007 |
| JP | 2007240941 A | 9/2007 |
| JP | 2009008841 A | 1/2009 |
| JP | 2010049085 A | 3/2010 |
| JP | 2012042557 A | 3/2012 |
| JP | 2012078788 A | 4/2012 |
| JP | 2013054269 A | 3/2013 |
| JP | 2013190453 A | 9/2013 |
| JP | 2014038236 A | 2/2014 |
| JP | 2014-197129 A | 10/2014 |
| JP | 2015156010 A | 8/2015 |
| JP | 2016048319 A | 4/2016 |
| JP | 2017026974 A | 2/2017 |
| JP | 2018189747 A | 11/2018 |
| JP | 2021047384 A | 3/2021 |
| WO | 2012102105 A1 | 8/2012 |
| WO | 2017043351 A1 | 3/2017 |
| WO | WO 2021/031885 A1 * | 2/2021 |

* cited by examiner

OPTICAL SYSTEM, IMAGE PICKUP APPARATUS, IN-VEHICLE SYSTEM, AND MOVING APPARATUS

BACKGROUND

Technical Field

The aspect of the embodiments relates to an optical system, an image pickup apparatus, an in-vehicle system, and a moving apparatus.

Description of the Related Art

Image pickup apparatuses such as in-vehicle cameras and surveillance cameras have been required to have high imaging performance, and cemented lenses thereof are required to prevent from being separated or damaged due to temperature changes because such image pickup apparatuses are expected to be used in a wide temperature range. A method has been known that corrects chromatic aberration and field curvature by using a refractive index difference or a dispersion difference between a positive lens and a negative lens of a cemented lens. Japanese Patent Laid-Open No. ("JP") 2014-197129 discloses a lens apparatus that corrects chromatic aberration and field curvature by using a cemented lens having a large difference in refractive index and dispersion.

However, in a combination of a positive lens and a negative lens having a large difference in dispersion and refractive index, substances contained in the positive lens and the negative lens are significantly different, and therefore a difference between linear expansion coefficients (linear expansion difference) of the positive lens and the negative lens are likely to be large. In a case where the linear expansion difference of the positive lens and the negative lens is large, if a large temperature change occurs, a large stress is caused by an expansion difference and/or a contraction difference of cemented surfaces of the cemented lens, which may cause separation or cracking.

SUMMARY

A system according to one aspect of the embodiments includes an aperture diaphragm, a first lens, and a second lens. The first lens is configured to be disposed next to the aperture diaphragm on an object side, and to include one or more positive lenses and one or more negative lens. The second lens is configured to be disposed next to the aperture diaphragm on an image side, and to include one or more positive lenses and one or more negative lens. Following inequalities are satisfied.

$1.70 < Np1 < 2.10$ $1.70 < Np2 < 2.10$ $1.75 < Nn1 < 2.10$ $1.75 < Nn2 < 2.10$ $0.01 < |Nsub| < 0.20$ $Np1$ represents a refractive index of a first positive lens closest to the aperture diaphragm in the one or more positive lenses of the first lens. $Nn1$ represents a refractive index of a first negative lens closest to the aperture diaphragm in the one or more negative lenses of the first lens. $Np2$ represents a refractive index of a second positive lens closest to the aperture diaphragm in the one or more positive lenses of the second lens. $Nn2$ represents a refractive index of a second negative lens closest to the aperture diaphragm in the one or more negative lenses of the second lens. $|Nsub|$ represents a value of a larger one of values of $|Np1-Nn1|$ and $|Np2-Nn2|$.

An image pickup apparatus according to one aspect of the embodiments includes the system and a sensor. The sensor is configured to image an object via the system.

An in-vehicle system according to one aspect of the embodiments includes the image pickup apparatus, at least one processor, and at least one memory. The at least one memory is coupled to the at least one processor and stores instructions that, when executed by the at least one processor, cause the at least one processor to function as a determining task. The determining task is configured to determine a possibility of a collision between a vehicle and the object, based on information on a distance to the object acquired by the image pickup apparatus.

Further features of the disclosure will become apparent from the following description of exemplary embodiments with reference to the attached drawings.

DESCRIPTION OF THE EMBODIMENTS

Figure 1:
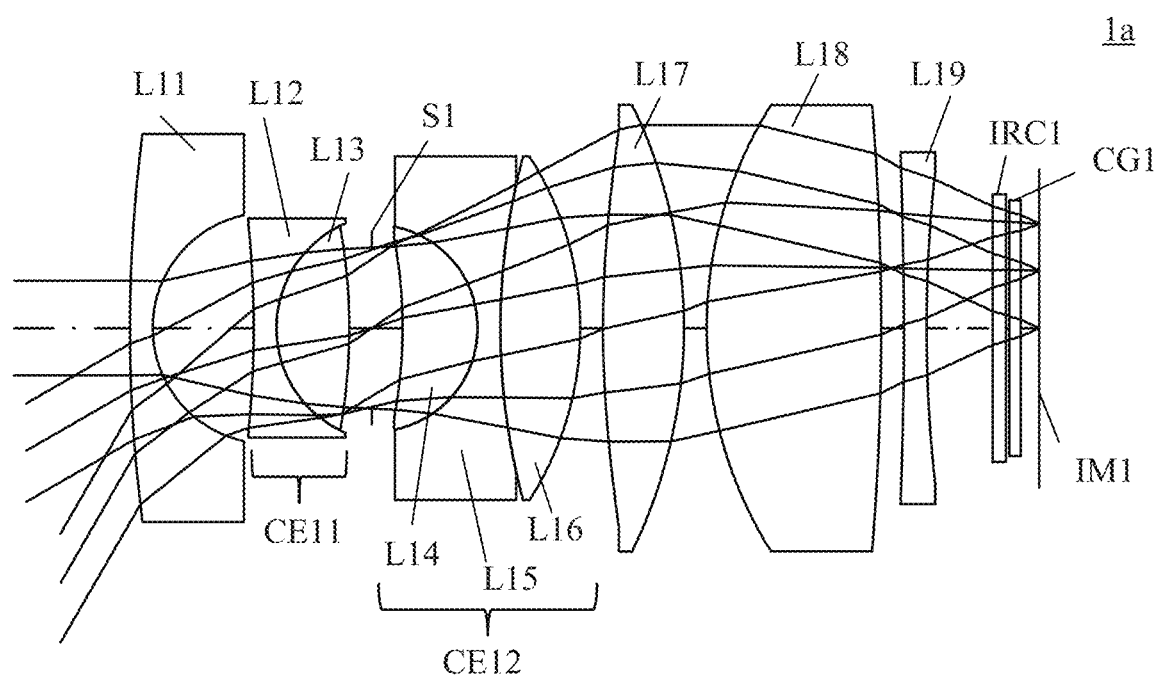
FIG. 1 is a sectional view illustrating an optical system according to Example 1.

Referring now to the accompanying drawings, a description is given of embodiments according to the present disclosure.

First, a description is given of a process leading to the present disclosure. In general, in order to correct chromatic aberration in a cemented lens, a positive lens includes (or is made of) glass of low refraction and low dispersion or of high refraction and low dispersion, and a negative lens includes (or is made of) glass of low refraction and high dispersion or of high refraction and high dispersion. In a case where a positive lens through which an on-axis peripheral ray passes at a high position includes a lens material of relatively low dispersion, a generation of chromatic aberration may be reduced.

However, in a case where the cemented lens is a combination of materials greatly different in dispersion and refractive index, included substances are greatly different between the positive lens and the negative lens, and therefore a difference between linear expansion coefficients (linear expansion difference) of the positive lens and the negative lens is likely to be large. In a case where the linear expansion difference of the positive lens and the negative lens is large, if a large temperature change occurs, a large stress is caused by a difference in expansion and/or contraction between cemented surfaces of the cemented lens, which may cause separation and/or cracking. In order that separation and cracking are prevented, positive and negative lens materials may be selected with a small linear expansion difference. However, materials with a small linear expansion difference often have relatively close refractive indexes. Thus, it is difficult to reduce occurrence of chromatic aberration by the cemented lens including materials with a small linear expansion difference.

On the other hand, in order that field curvature is corrected, the cemented lens is to have a configuration that satisfies the following equation (1) for reducing a Petzval sum. Since the Petzval sum correlates with the field curvature, the field curvature can be reduced by reducing the Petzval sum. In the equation (1), f1 represents a focal length of a first lens closest to an object side in an optical system (system), f2 represents a focal length of a second lens, f3 represents a focal length of a third lens, and fn represents a focal length of an N-th lens. N1 represents a refractive index of the first lens, N2 represents a refractive index of the second lens, N3 represents a refractive index of the third lens, and Nn represents a refractive index of the N-th lens.

$$\frac{1}{f1N1} + \frac{1}{f2N2} + \frac{1}{f3N3} + \ldots + \frac{1}{fnNn} = 0 \qquad (1)$$

Normally, a refractive index of a lens is positive, and hence for reducing field curvature, at least one lens may have a negative focal length. In a case where a glass material with a high refractive index is selected as a material for each lens, it is possible to reduce the occurrence of Petzval curvature in each lens. In other words, materials with high refractive indexes are suitable for both the positive lens and the negative lens for a purpose of correcting field curvature while hindering separation and cracking of the cemented lens when a large temperature change occurs.

For example, in Example 1 described below, a negative lens (lens) L11 through which an on-axis peripheral ray passes at a high position includes a glass material of low refraction and low dispersion, but a cemented lens CE11 including a negative lens L12 and a positive lens L13 includes a high refractive index material. That is, the glass material is selected such that chromatic aberration occurs in a lens unit on a front side (object side) of a diaphragm (aperture diaphragm) S1 that determines an F-number (diaphragm value) of the optical system. A cemented lens CE12 including a positive lens L14, a negative lens L15, and a positive lens L16 on a rear side (image side) of the diaphragm S1 includes a material of high refraction and high dispersion. In this way, glass materials of the cemented lenses on a front side and a rear side of the diaphragm are selected such that chromatic aberration occurs in each lens, but generated amounts of positive and negative chromatic aberration are balanced, and the chromatic aberration is corrected as a whole.

As described above, in order that chromatic aberration and field curvature are corrected while separation and cracking of the cemented lens are hindered even when a large temperature change occurs, materials with small refractive index difference and having high refractive indexes are selected as materials of a positive lens and a negative lens included in a cemented lens, which provides high imaging performance. Each example is described below.

FIG. 1, FIG. 3, FIG. 5, and FIG. 7 are sectional views illustrating optical systems 1a to 1d according to Examples 1 to 4, respectively. The optical system according to each example is an image pickup optical system used in an image pickup apparatus such as a digital video camera, a digital still camera, a broadcasting camera, a silver halide film camera, and a monitoring camera. In each sectional view, a left side represents an object side (front side) and a right side represents an image side (rear side). In each sectional view, IM1, IM2, IM3, and IM4 represent an image plane, and an image sensor such as a CMOS sensor and a CCD sensor is disposed as each of them.

The optical system according to each example includes an aperture diaphragm, a cemented lens (first cemented lens, first lens) disposed next to the aperture diaphragm on the object side, and a cemented lens (second cemented lens, second lens) disposed next to the aperture diaphragm on the image side. The first cemented lens includes one or more positive lenses and one or more negative lenses. The second cemented lens includes one or more positive lenses and one or more negative lenses. It is assumed that Np1 represents a refractive index of a first positive lens closest to the aperture diaphragm in the one or more positive lenses of the first cemented lens, and Nn1 represents a refractive index of a first negative lens closest to the aperture diaphragm in the one or more negative lenses of the first cemented lens. It is assumed that Np2 represents a refractive index of a second positive lens closest to the aperture diaphragm in the one or more positive lenses of the second cemented lens, and Nn2 represents a refractive index of a second negative lens closest to the aperture diaphragm in the one or more negative lenses of the second cemented lens. |Nsub| represents a value of a larger one of values of |Np1−Nn1| and |Np2−Nn2|. Here, the following inequalities (1-1) to (1-4) and (2) are satisfied.

$$1.70 < Np1 < 2.10 \qquad (1\text{-}1)$$

$$1.70 < Np2 < 2.10 \qquad (1\text{-}2)$$

$$1.75 < Nn1 < 2.10 \qquad (1\text{-}3)$$

$$1.75 < Nn2 < 2.10 \qquad (1\text{-}4)$$

$$0.01 < |Nsub| < 0.20 \qquad (2)$$

If the respective values do not fall within the numerical ranges of the inequalities (1-1) to (1-4) and (2), in a case where a large temperature change occurs, it is difficult to correct chromatic aberration and field curvature while the cemented lens is hindered from separating and cracking. The inequalities are applicable if the first cemented lens or the second cemented lens consists of two or more positive lenses or two or more negative lenses in each example.

The numerical ranges of the inequalities (1-1) to (1-4) and (2) may be set to numerical ranges of the following inequalities (1-1a) to (1-4a) and (2a).

$$1.71 < Np1 < 2.05 \tag{1-1a}$$

$$1.71 < Np2 < 2.05 \tag{1-2a}$$

$$1.77 < Nn1 < 2.05 \tag{1-3a}$$

$$1.77 < Nn2 < 2.05 \tag{1-4a}$$

$$0.03 < |Nsub| < 0.19 \tag{2a}$$

The numerical ranges of the inequalities (1-1) to (1-4) and (2) may be set to numerical ranges of the following inequalities (1-1b) to (1-4b) and (2b).

$$1.72 < Np1 < 2.00 \tag{1-1b}$$

$$1.72 < Np2 < 2.00 \tag{1-2b}$$

$$1.80 < Nn1 < 2.00 \tag{1-3b}$$

$$1.80 < Nn2 < 2.00 \tag{1-4b}$$

$$0.05 < |Nsub| < 0.18 \tag{2b}$$

Both $|Np1-Nn1|$ representing an absolute value of a difference between refractive indexes of the first positive lens and the first negative lens and $|Np2-Nn2|$ representing an absolute value of a difference between refractive indexes of the second positive lens and the second negative lens may satisfy the inequality (2).

A curvature radius of each of cemented surfaces on front and rear sides of the diaphragm is to be reduced so that the refractive power of each lens is ensured in a case where lenses having similar refractive indexes are cemented. The following inequality (3) may be satisfied where RA represents a minimum curvature radius of a cemented surface of a cemented lens (first cemented lens) disposed on the object side of the diaphragm (curvature radius of each of a cemented surface of the first positive lens and a cemented surface of the first negative lens that are cemented to each other), RB represents a minimum curvature radius of a cemented surface of the cemented lens (second cemented lens) disposed on the image plane side of the diaphragm (curvature radius of each of a cemented surface of the second positive lens and a cemented surface of the second negative lens that are cemented to each other).

$$0.85 < |RA/RB| < 1.30 \tag{3}$$

If the value does not fall within the numerical range between the upper limit value and the lower limit value of the inequality (3), it is difficult to ensure a refractive power of each lens in the case where the lenses with close refractive indexes are cemented.

The numerical range of the inequality (3) may be set to a numerical range of the following inequality (3a).

$$0.87 < |RA/RB| < 1.25 \tag{3a}$$

The numerical range of the inequality (3) may be set to a numerical range of the following inequality (3b).

$$0.90 < |RA/RB| < 1.20 \tag{3b}$$

If lateral chromatic aberration is to be corrected by making light beams in a wide angle of view converge, the following inequality (4) may be satisfied where f represents a focal length of the optical system (entire system), and f1 represents a focal length of the first lens closest to the object side in the optical system.

$$-4.0 < f1/f < -1.0 \tag{4}$$

The numerical range of the inequality (4) may be set to a numerical range of the following inequality (4a).

$$-3.5 < f1/f < -1.4 \tag{4a}$$

The numerical range of the inequality (4) may be set to a numerical range of the following inequality (4b).

$$-2.8 < f1/f < -1.8 \tag{4b}$$

If the value does not fall within the numerical range of the inequality (4), it is difficult to correct lateral chromatic aberration.

The cemented lenses (first cemented lens and second cemented lens) on the front and rear sides of the diaphragm correct spherical aberration, field curvature, and chromatic aberration in a bright F-number (Fno), and this correction is affected by a relationship between focal lengths in the cemented lenses on the front and rear sides of the diaphragm. The following inequalities (5) to (8) may be satisfied where fp1 represents a focal length of the first positive lens of the first cemented lens, fn1 represents a focal length of the first negative lens of the first cemented lens, fp2 represents a focal length of the second positive lens of the second cemented lens, and fn2 represents a focal length of the second negative lens of the second cemented lens.

$$-2.000 < fn1/f < -0.001 \tag{5}$$

$$0.001 < fp1/f < 2.000 \tag{6}$$

$$-2.500 < fn2/f < -0.001 \tag{7}$$

$$0.001 < fp2/f < 2.500 \tag{8}$$

The numerical ranges of the inequalities (5) to (8) may be respectively set to numerical ranges of the following inequalities (5a) to (8a).

$$-1.800 < fn1/f < -0.001 \tag{5a}$$

$$0.001 < fp1/f < 1.800 \tag{6a}$$

$$-2.300 < fn2/f < -0.001 \tag{7a}$$

$$0.001 < fp2/f < 2.300 \tag{8a}$$

The numerical ranges of the inequalities (5) to (8) may be respectively set to numerical ranges of the following inequalities (5b) to (8b).

$$-1.500 < fn1/f < -0.001 \tag{5b}$$

$$0.001 < fp1/f < 1.500 \tag{6b}$$

$$-2.000 < fn2/f < -0.001 \tag{7b}$$

$$0.001 < fp2/f < 2.000 \tag{8b}$$

If the respective values do not fall within the numerical ranges of the inequalities (5) to (8), it is difficult to perform balanced correction of spherical aberration, field curvature, and chromatic aberration.

The following inequality (9) may be satisfied where D0 represents an effective diameter of at least one of the first negative lens and the second negative lens, and D1 represents an outer diameter of the at least one. An effective diameter is a diameter of an area (effective area) through which an effective light beam passes, and the effective light beam contributes to imaging on an optical surface. In each example, the effective diameter of the first negative lens is smaller than the effective diameter of the second negative lens, but the present disclosure is not limited to this, and the effective diameter of the first negative lens may be larger than the effective diameter of the second negative lens.

$$1.5 < D1/D0 < 15.0 \tag{9}$$

If the value is smaller than the lower limit of the inequality (9), it is difficult to make the outer diameter of the cemented lens close to an outer diameter of the other lens, and a lens barrel configuration is to be more complicated, which increases a cost of the optical system. On the other hand, if the value is larger than the upper limit of the inequality (9), a cost of a material of a negative lens increases so as to make the outer diameter of the cemented lens close to the outer diameter of the other lens.

The numerical range of the inequality (9) may be set to a numerical range of the following inequality (9a).

2.0<D1/D0<14.5 (9a)

The numerical range of the inequality (9) may be set to a numerical range of the following inequality (9b).

2.5<D1/D0<14.0 (9b)

The optical system according to each example includes, in order from the object side to the image side, the first negative lens, the first positive lens, the diaphragm, the second positive lens, and the second negative lens, but the present disclosure is not limited to this, and the order of the positive lens and the negative lens of each cemented lens may be opposite. In each example, all lenses constituting the optical system are always fixed (that is, the optical system is neither a zoom lens nor a focus lens), but the present disclosure is not limited to this. For example, the optical system may be a fixed-focus optical system (fixed-focus lens) whose focal length does not change.

Hereinafter, a specific description is given of a configuration of the optical system according to each example.

EXAMPLE 1

First, a description is given of an optical system 1a according to Example 1. As illustrated in FIG. 1, the optical system 1a includes, in order from an object side to an image side, a negative lens L11, a cemented lens CE11, a diaphragm S1, a cemented lens CE12, a positive lens L17, a positive lens L18, a negative lens L19, a wavelength selective filter IRC1, and a cover glass CG1. The negative lens L11 is the first lens closest to the object side in the optical system 1a. The cemented lens CE11 is the first cemented lens disposed next to the diaphragm S1 on the object side and includes a negative lens (first negative lens) L12, and a positive lens (first positive lens) L13. The cemented lens CE12 is the second cemented lens disposed next to the diaphragm S1 on the image side and includes a positive lens (second positive lens) L14, a negative lens (second negative lens) L15, and a positive lens L16. The cover glass CG1 is for protecting an image sensor disposed at an image plane IM1.

In each cemented lens, an adhesive or the like is applied between the positive lens and the negative lens and they are adhered to each other. Presence or absence of a filter and a wavelength range of the filter are not limited. These points are similar in each example described below.

Table 1 is numerical data of the optical system 1a according to this example. As optical specifications according to this example, a focal length is set to 5 mm, an image side Fno is set to 1.2, and a half angle of view is set to 0 to 60 degrees. A design wavelength is set to 486.1 to 656.27 nm. Each example uses, as glass materials, optical glass produced by OHARA INC. or HOYA Corporation, but other equivalent products may be used.

TABLE 1

| OBJECT SIDE SURFACE | | CURVATURE RADIUS | DISTANCE INFINITE DISTANCE | GLASS MATERIAL |
|---|---|---|---|---|
| L11 | SPHERICAL SURFACE | 66.21 | 1.00 | SBSL7_OHARA |
|  | SPHERICAL SURFACE | 5.09 | 4.44 |  |
| L12 | SPHERICAL SURFACE | −45.75 | 1.00 | SMBH56_OHARA |
| L13 | SPHERICAL SURFACE | 5.02 | 3.21 | SNPH3_OHARA |
|  | SPHERICAL SURFACE | −25.25 | 1.00 |  |
| S1 |  | PLANAR SURFACE | 1.34 |  |
| L14 | SPHERICAL SURFACE | −21.13 | 3.30 | SLAM60_OHARA |
| L15 | SPHERICAL SURFACE | −4.57 | 1.00 | SNPH4_OHARA |
| L16 | SPHERICAL SURFACE | 29.18 | 3.51 | SLAH59_OHARA |
|  | SPHERICAL SURFACE | −13.91 | 1.00 |  |
| L17 | ASPHERICAL SURFACE 11 | 47.16 | 3.56 | MTAFD305_HOYA |
|  | ASPHERICAL SURFACE 12 | −21.77 | 1.00 |  |
| L18 | SPHERICAL SURFACE | 18.48 | 7.67 | SLAH89_OHARA |
|  | SPHERICAL SURFACE | −120.94 | 1.00 |  |
| L19 | SPHERICAL SURFACE | −198.33 | 1.00 | SBSL7_OHARA |
|  | SPHERICAL SURFACE | 63.61 | 2.90 |  |
| IRC1 |  | PLANAR SURFACE | 0.58 | BK7_SCHOTT |
|  |  | PLANAR SURFACE | 0.15 |  |
| CG1 |  | PLANAR SURFACE | 0.50 | BK7_SCHOTT |
|  |  | PLANAR SURFACE | 0.81 |  |
| IM1 |  | — |  |  |

Table 2 is aspherical surface shape data of the optical system 1a. The aspherical surface shape according to each example is expressed by the following equation (2) where, when an optical axis direction is assumed to be a Z axis, a direction orthogonal to the optical axis is assumed to be an h axis, and a light traveling direction is assumed to be a positive direction, R represents a paraxial curvature radius, k represents a conic constant, A to D represent aspherical coefficients of fourth, sixth, eighth, tenth orders, respectively. "e±XX" in each aspherical coefficient represents "$\times 10^{\pm XX}$"

$$Z = \frac{(1/R)h^2}{1+\sqrt{1-(1+k)(1/R)^2 h^2}} + Ah^4 + Bh^6 + Ch^8 + Dh^{10} \quad (2)$$

TABLE 2

|  | ASPHERICAL SURFACE 11 | ASPHERICAL SURFACE 12 |
|---|---|---|
| PARAXIAL CURVATURE RADIUS R | 47.16 | −21.77 |
| CONIC CONSTANT k | 0.00 | 0.00 |
| COEFFICIENT A OF 4TH ORDER | −2.02E−05 | 1.62E−05 |
| COEFFICIENT B OF 6TH ORDER | −2.25E−07 | −4.68E−07 |
| COEFFICIENT C OF 8TH ORDER | 5.71E−09 | 8.56E−09 |
| COEFFICIENT D OF 10TH ORDER | −3.83E−11 | −4.93E−11 |

Figure 2:
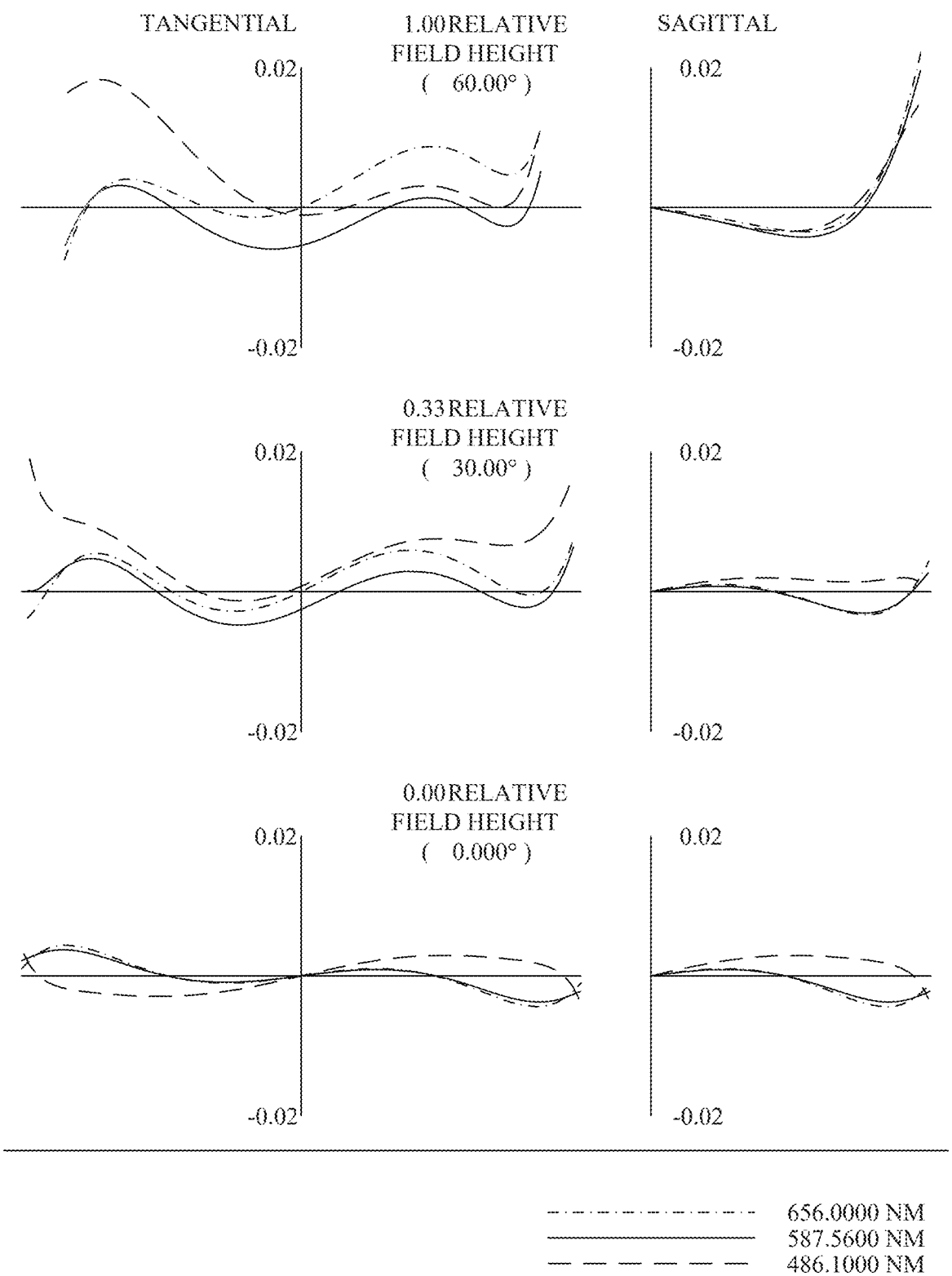
FIG. 2 is a lateral aberration diagram of the optical system according to Example 1.

FIG. 2 is lateral aberration diagrams of the optical system 1a. FIG. 2 illustrates lateral aberrations at a C-line (wavelength 656.3 nm), a d-line (wavelength 587.6 nm), and an F-line (wavelength 486.1 nm) in three angle of views of the optical system 1a, and a unit of each numerical value is mm. As illustrated in FIG. 2, field curvature, chromatic aberration, etc. are corrected well. An aperture ratio (vignetting) of the optical system 1a is 100% at every angle of view, and thus a bright optical system can be realized from on-axis to off-axis.

EXAMPLE 2

Figure 3:
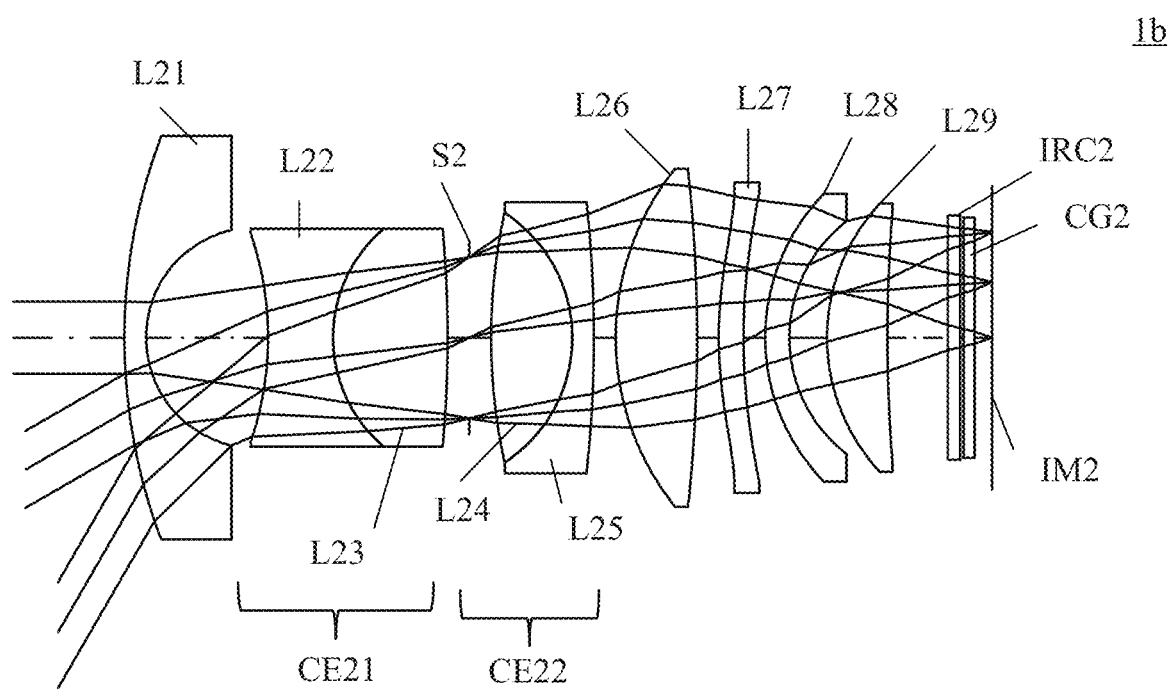
FIG. 3 is a sectional view illustrating an optical system according to Example 2.

Next, with reference to FIG. 3, a description is given of an optical system 1b according to Example 2. The optical system 1b includes, in order from an object side to an image side, a negative lens L21, a cemented lens CE21, a diaphragm (aperture diaphragm) S2, a cemented lens CE22, positive lenses L26 and L27, a negative lens L28, a positive lens L29, a wavelength selective filter IRC2, and a cover glass CG2. The negative lens L21 is a lens closest to the object side in the optical system 1b. The cemented lens CE21 is the first cemented lens disposed next to the diaphragm S2 on the object side and includes a negative lens (first negative lens) L22 and a positive lens (first positive lens) L23. The cemented lens CE22 is the second cemented lens disposed next to the diaphragm S2 on the image side and includes a positive lens (second positive lens) L24 and a negative lens (second negative lens) L25. The cover glass CG2 is for protecting an image sensor disposed at an image plane IM1.

Table 3 is numerical data of the optical system 1b according to this example. As optical specifications according to this example, a focal length is set to 5 mm, an image side Fno is set to 1.5, a half angle of view is set to 0 to 60 degrees. A design wavelength is set to 486.1 to 656.27 nm.

TABLE 3

| OBJECT SIDE SURFACE | | CURVATURE RADIUS | DISTANCE INFINITE DISTANCE | GLASS MATERIAL |
|---|---|---|---|---|
| L21 | SPHERICAL SURFACE | 26.41 | 1.00 | SBSL7_OHARA |
|  | SPHERICAL SURFACE | 5.11 | 5.63 |  |
| L22 | SPHERICAL SURFACE | −14.63 | 2.99 | SNBH56_OHARA |
| L23 | SPHERICAL SURFACE | 6.55 | 5.29 | SNPH3_OHARA |
|  | SPHERICAL SURFACE | −53.70 | 1.00 |  |
| S2 |  | PLANAR SURFACE | 1.00 |  |
| L24 | SPHERICAL SURFACE | 26.95 | 3.74 | SLAH59_OHARA |
| L25 | SPHERICAL SURFACE | −6.88 | 1.00 | SNPH4_OHARA |
|  | SPHERICAL SURFACE | −56.90 | 1.00 |  |
| L26 | SPHERICAL SURFACE | 12.50 | 3.75 | SLAL20_OHARA |
|  | SPHERICAL SURFACE | −72.73 | 1.00 |  |
| L27 | ASPHERICAL SURFACE 21 | 20.04 | 1.14 | MTAFD305_HOYA |
|  | ASPHERICAL SURFACE 22 | 32.59 | 1.00 |  |
| L28 | SPHERICAL SURFACE | 9.49 | 1.11 | SLAH89_OHARA |
|  | SPHERICAL SURFACE | 6.80 | 1.74 |  |
| L29 | SPHERICAL SURFACE | 9.08 | 2.78 | SBSL7_OHARA |
|  | SPHERICAL SURFACE | 72.98 | 2.78 |  |
| IRC2 |  | PLANAR SURFACE | 0.58 | BK7_SCHOTT |
|  |  | PLANAR SURFACE | 0.15 |  |
| CG2 |  | PLANAR SURFACE | 0.50 | BK7_SCHOTT |
|  |  | PLANAR SURFACE | 0.81 |  |
| IM2 |  | — |  |  |

Table 4 is aspherical surface shape data of the optical system 1b.

TABLE 4

|  | ASPHERICAL SURFACE 21 | ASPHERICAL SURFACE 22 |
|---|---|---|
| PARAXIAL CURVATURE RADIUS R | 20.04 | 32.59 |
| CONIC CONSTANT k | 0.00 | 0.00 |
| COEFFICIENT A OF 4TH ORDER | 3.13E−05 | 2.70E−04 |
| COEFFICIENT B OF 6TH ORDER | −1.09E−05 | −1.36E−05 |
| COEFFICIENT C OF 8TH ORDER | 1.59E−07 | 2.41E−07 |
| COEFFICIENT D OF 10TH ORDER | −7.92E−10 | −1.44E−09 |

Figure 4:
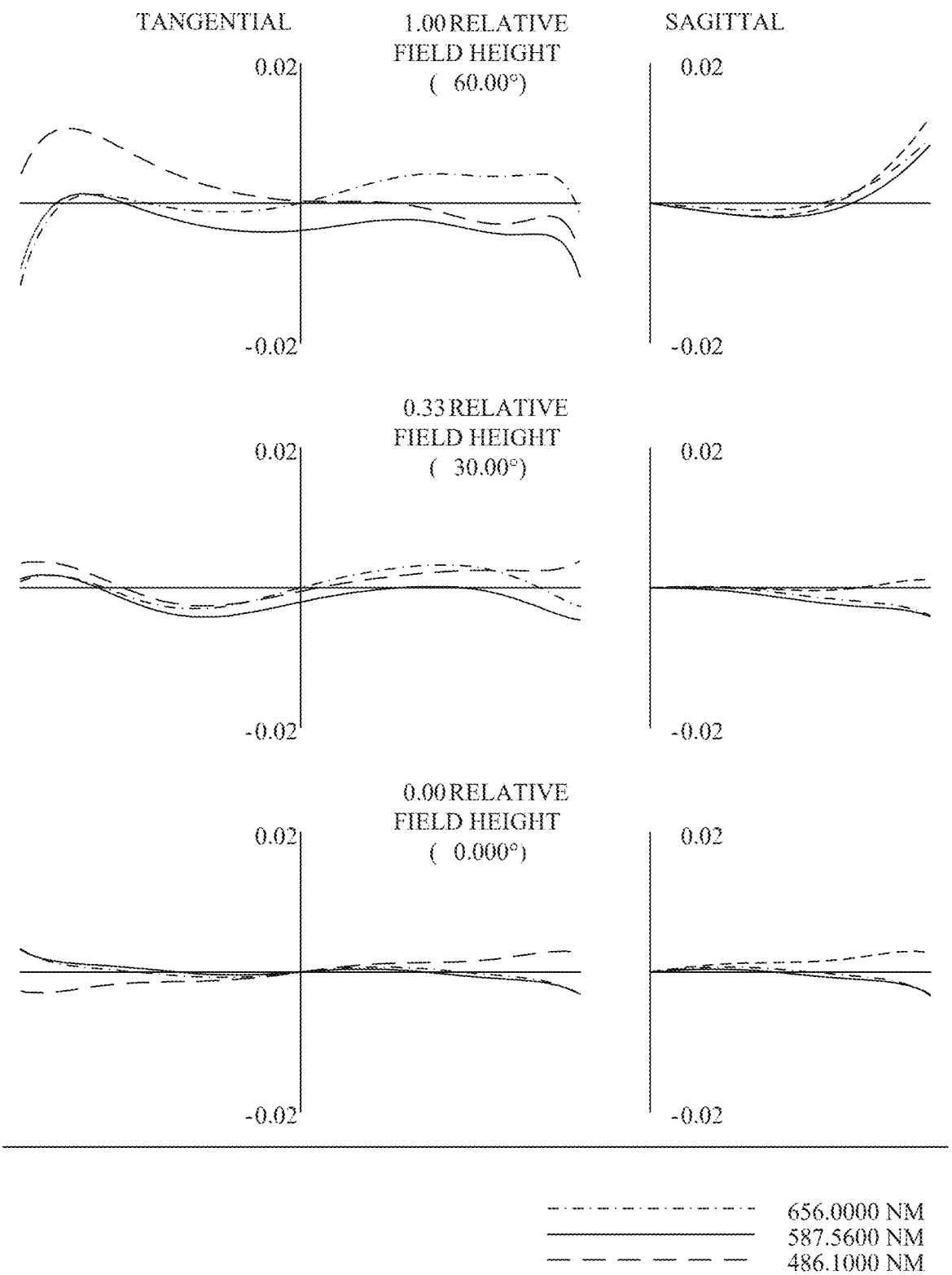
FIG. 4 is a lateral aberration diagram of the optical system according to Example 2.

FIG. 4 is lateral aberration diagrams of the optical system 1b. FIG. 4 illustrates lateral aberrations at a C-line (wavelength 656.3 nm), a d-line (wavelength 587.6 nm), and an F-line (wavelength 486.1 nm) in three angle of views of the optical system 1b, and a unit of each numerical value is mm. As illustrated in FIG. 4, field curvature, chromatic aberration, etc. are corrected well. An aperture ratio (vignetting) of the optical system 1b is 100% at every angle of view, and thus a bright optical system can be realized from on-axis to the off-axis.

EXAMPLE 3

Figure 5:
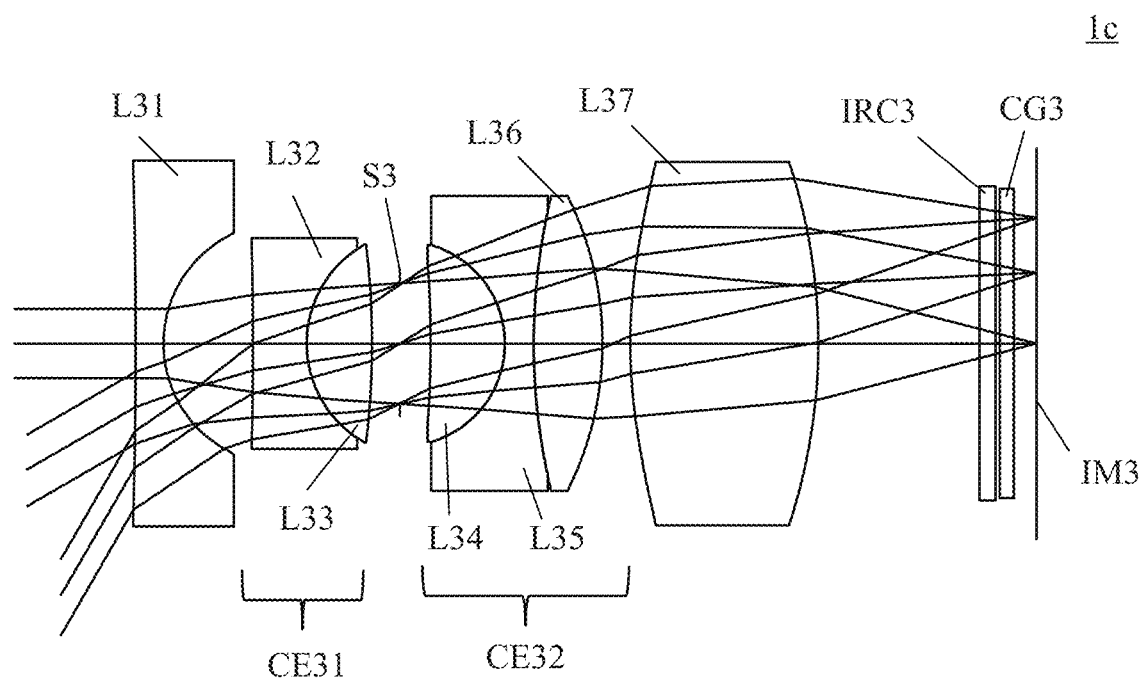
FIG. 5 is a sectional view illustrating an optical system according to Example 3.

Next, with reference to FIG. 5, a description is given of an optical system 1c according to Example 3. The optical system 1c includes, in order from an object side to an image side, a negative lens (lens) L31, a cemented lens CE31, a diaphragm (aperture diaphragm) S3, a cemented lens CE32, a positive lens L37, a wavelength selective filter IRC3, and a cover glass CG3. The cemented lens CE31 is the first cemented lens disposed next to the diaphragm S3 on the object side, and includes a negative lens (first negative lens) L32 and a positive lens (first positive lens) L33. The cemented lens CE32 is the second cemented lens disposed next to the diaphragm S3 on the image side and includes a positive lens (second positive lens) L34, a negative lens (second negative lens) L35, and a positive lens L36. The cover glass CG3 is for protecting an image sensor disposed at an image plane IM3.

Figure 6:
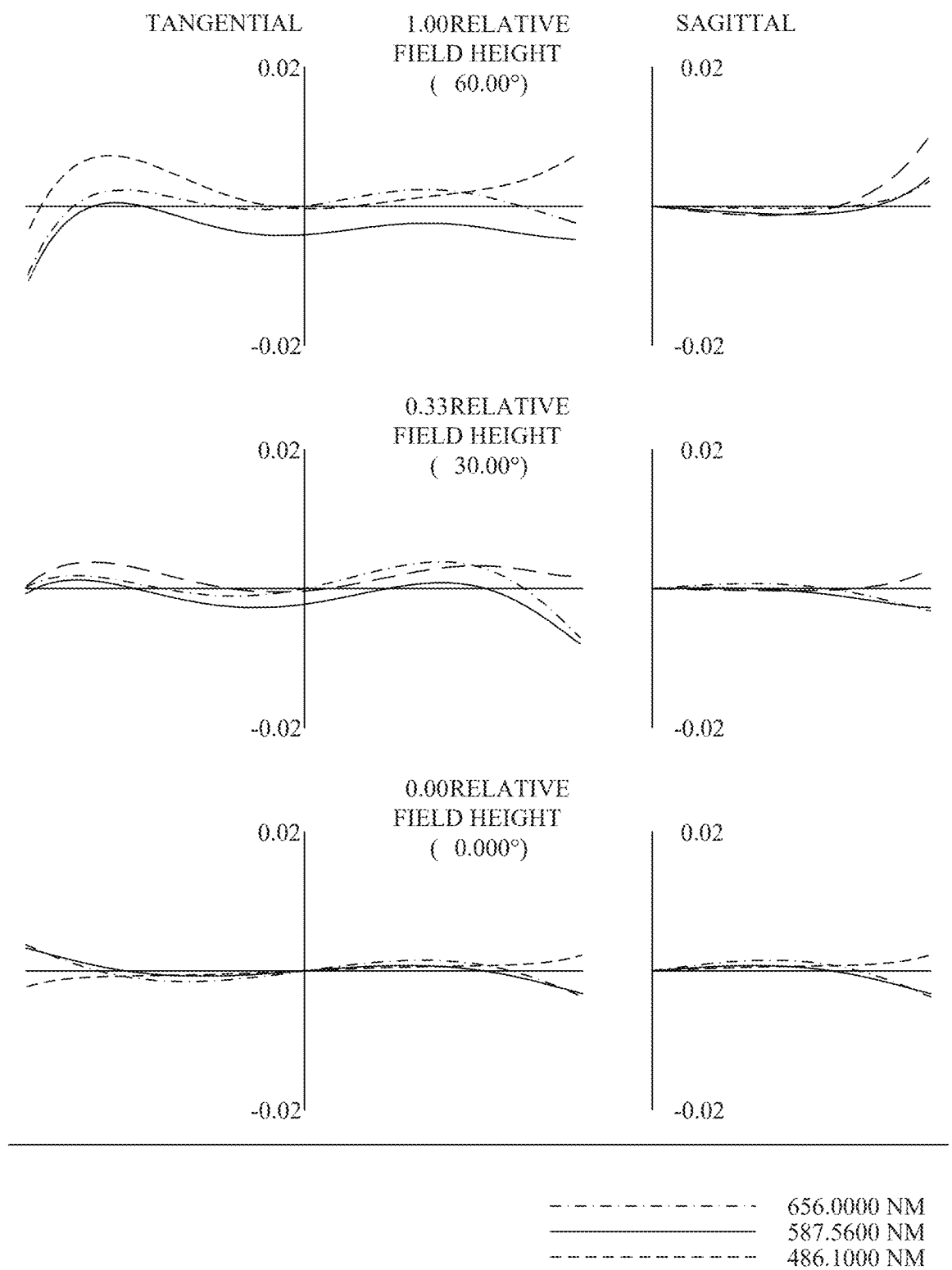
FIG. 6 is a lateral aberration diagram of the optical system according to Example 3.

Table 5 is numerical data of the optical system 1c according to this example. As optical specifications according to this example, a focal length is set to 5 mm, an image side Fno is set to 2.0, a half angle of view is set to 0 to 60 degrees. A design wavelength is set to 486.1 to 656.27 nm.

length 656.3 nm), a d-line (wavelength 587.6 nm), and an F-line (wavelength 486.1 nm) in three angle of views of the optical system 1c, and a unit of each numerical value is mm. As illustrated in FIG. 6, field curvature, chromatic aberration, etc. are corrected well. An aperture ratio (vignetting) of the optical system 1c is 100% at every angle of view, and thus a bright optical system can be realized from on-axis to the off-axis.

EXAMPLE 4

Figure 7:
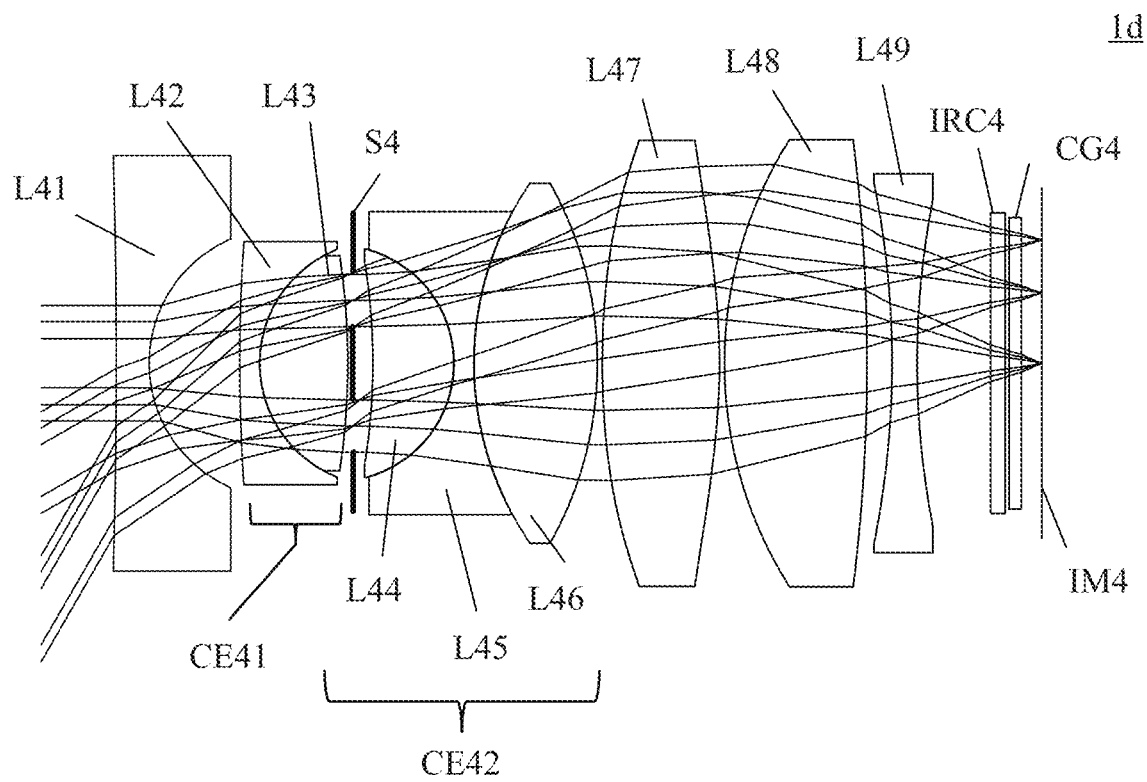
FIG. 7 is a sectional view illustrating an optical system according to Example 4.

Next, with reference to FIG. 7, a description is given of an optical system 1d according to Example 4. The optical system 1d includes, in order from an object side to an image side, a negative lens L41, a cemented lens CE41, a diaphragm (aperture diaphragm) S4, a cemented lens CE42, a positive lens L47, a positive lens L48, a negative lens L49, a wavelength selective filter IRC4, and a cover glass CG4.

TABLE 5

| OBJECT SIDE SURFACE | | CURVATURE RADIUS | DISTANCE INFINITE DISTANCE | GLASS MATERIAL |
|---|---|---|---|---|
| L31 | SPHERICAL SURFACE | −252.07 | 1.00 | SBSL7_OHARA |
|  | SPHERICAL SURFACE | 4.37 | 3.20 |  |
| L32 | SPHERICAL SURFACE | −157.96 | 1.92 | SNBH56_OHARA |
| L33 | SPHERICAL SURFACE | 4.08 | 2.34 | SNPH2_OHARA |
|  | SPHERICAL SURFACE | −29.65 | 1.00 |  |
| S3 |  | PLANAR SURFACE | 1.10 |  |
| L34 | SPHERICAL SURFACE | −39.59 | 2.66 | SLAM60_OHARA |
| L35 | SPHERICAL SURFACE | −3.68 | 1.03 | SNPH1_OHARA |
| L36 | SPHERICAL SURFACE | 22.64 | 2.46 | SLAH58_OHARA |
|  | SPHERICAL SURFACE | −11.78 | 1.00 |  |
| L37 | ASPHERICAL SURFACE 31 | 19.95 | 6.73 | MTAFD305_HOYA |
|  | ASPHERICAL SURFACE 32 | −19.88 | 5.77 |  |
| IRC3 |  | PLANAR SURFACE | 0.58 | BK7_SCHOTT |
|  |  | PLANAR SURFACE | 0.15 |  |
| 003 |  | PLANAR SURFACE | 0.50 | BK7_SCHOTT |
|  |  | PLANAR SURFACE | 0.81 |  |
| IM3 |  | — |  |  |

Table 6 is aspherical surface shape data of the optical system 1c.

TABLE 6

|  | ASPHERICAL SURFACE 31 | ASPHERICAL SURFACE 32 |
|---|---|---|
| PARAXIAL CURVATURE RADIUS R | 19.95 | −19.88 |
| CONIC CONSTANT k | 0.00 | 0.00 |
| COEFFICIENT A OF 4TH ORDER | −8.78E−05 | 6.55E−05 |
| COEFFICIENT B OF 6TH ORDER | −2.97E−07 | −2.17E−06 |
| COEFFICIENT C OF 8TH ORDER | 1.99E−08 | 5.93E−08 |
| COEFFICIENT D OF 10TH ORDER | −5.09E−10 | −7.80E−10 |

FIG. 6 is lateral aberration diagrams of the optical system 1c. FIG. 6 illustrates lateral aberrations at a C-line (wave- The negative lens L41 is a lens closest to the object side in the optical system 1d. The cemented lens CE41 is the first cemented lens disposed next to the diaphragm S4 on the object side and includes a negative lens (first negative lens) L42 and a positive lens (first positive lens) L43. The cemented lens CE42 is the second cemented lens disposed next to the diaphragm S4 on the image side and includes a positive lens (second positive lens) L44, a negative lens (second negative lens) L45, and a positive lens L46. The cover glass CG4 is for protecting an image sensor disposed at an image plane IM4.

Table 7 is numerical data of the optical system 1d according to this example. As optical specifications according to this example, a focal length is set to 5 mm, an image side Fno is set to 1.2, a half angle of view is set to 0 to 60 degrees. A design wavelength is set to 486.1 to 656.27 nm.

TABLE 7

| OBJECT SIDE SURFACE | | CURVATURE RADIUS | DISTANCE INFINITE DISTANCE | GLASS MATERIAL |
|---|---|---|---|---|
| L41 | SPHERICAL SURFACE | −276.861 | 1.31 | SBSL7_OHARA |
|  | SPHERICAL SURFACE | 5.42372 | 3.62 |  |
| L42 | SPHERICAL SURFACE | 70.8962 | 0.80 | SNBH56_OHARA |
| L43 | SPHERICAL SURFACE | 4.90146 | 3.52 | SNPH3_OHARA |
|  | SPHERICAL SURFACE | −28.9776 | 0.20 |  |
| S4 |  | PLANAR SURFACE | 0.80 |  |

TABLE 7-continued

| OBJECT SIDE SURFACE | | CURVATURE RADIUS | DISTANCE INFINITE DISTANCE | GLASS MATERIAL |
|---|---|---|---|---|
| L44 | SPHERICAL SURFACE | −25.3327 | 3.24 | SLAM60_OHARA |
| L45 | SPHERICAL SURFACE | −4.7287 | 0.80 | SNPH4_OHARA |
| L46 | SPHERICAL SURFACE | 12.69594 | 4.93 | SLAH59_OHARA |
|  | SPHERICAL SURFACE | −14.6644 | 0.20 |  |
| L47 | ASPHERICAL SURFACE 41 | 34.13 | 4.68 | MTAFD305_HOYA |
|  | ASPHERICAL SURFACE 42 | −28.08 | 0.20 |  |
| L48 | SPHERICAL SURFACE | 16.65 | 5.70 | SLAH89_OHARA |
|  | SPHERICAL SURFACE | −71.42 | 1.00 |  |
| L49 | SPHERICAL SURFACE | −36.47 | 1.00 | SBSL7_OHARA |
|  | SPHERICAL SURFACE | 34.36 | 2.94 |  |
| IRC4 |  | PLANAR SURFACE | 0.58 | BK7_SCHOTT |
|  |  | PLANAR SURFACE | 0.15 |  |
| CG4 |  | PLANAR SURFACE | 0.50 | BK7_SCHOTT |
|  |  | PLANAR SURFACE | 0.81 |  |
| IM4 |  | — |  |  |

Table 8 is aspherical surface shape data of the optical system 1d.

TABLE 8

|  | ASPHERICAL SURFACE 41 | ASPHERICAL SURFACE 42 |
|---|---|---|
| PARAXIAL CURVATURE RADIUS R | 34.13 | −28.08 |
| CONIC CONSTANT k | 0.00 | 0.00 |
| COEFFICIENT A OF 4TH ORDER | 7.88E−05 | 8.93E−05 |
| COEFFICIENT B OF 6TH ORDER | −6.50E−07 | −2.71E−07 |
| COEFFICIENT C OF 8TH ORDER | 7.65E−09 | 5.80E−09 |
| COEFFICIENT D OF 10TH ORDER | −6.01E−11 | −6.17E−11 |

Figure 8:
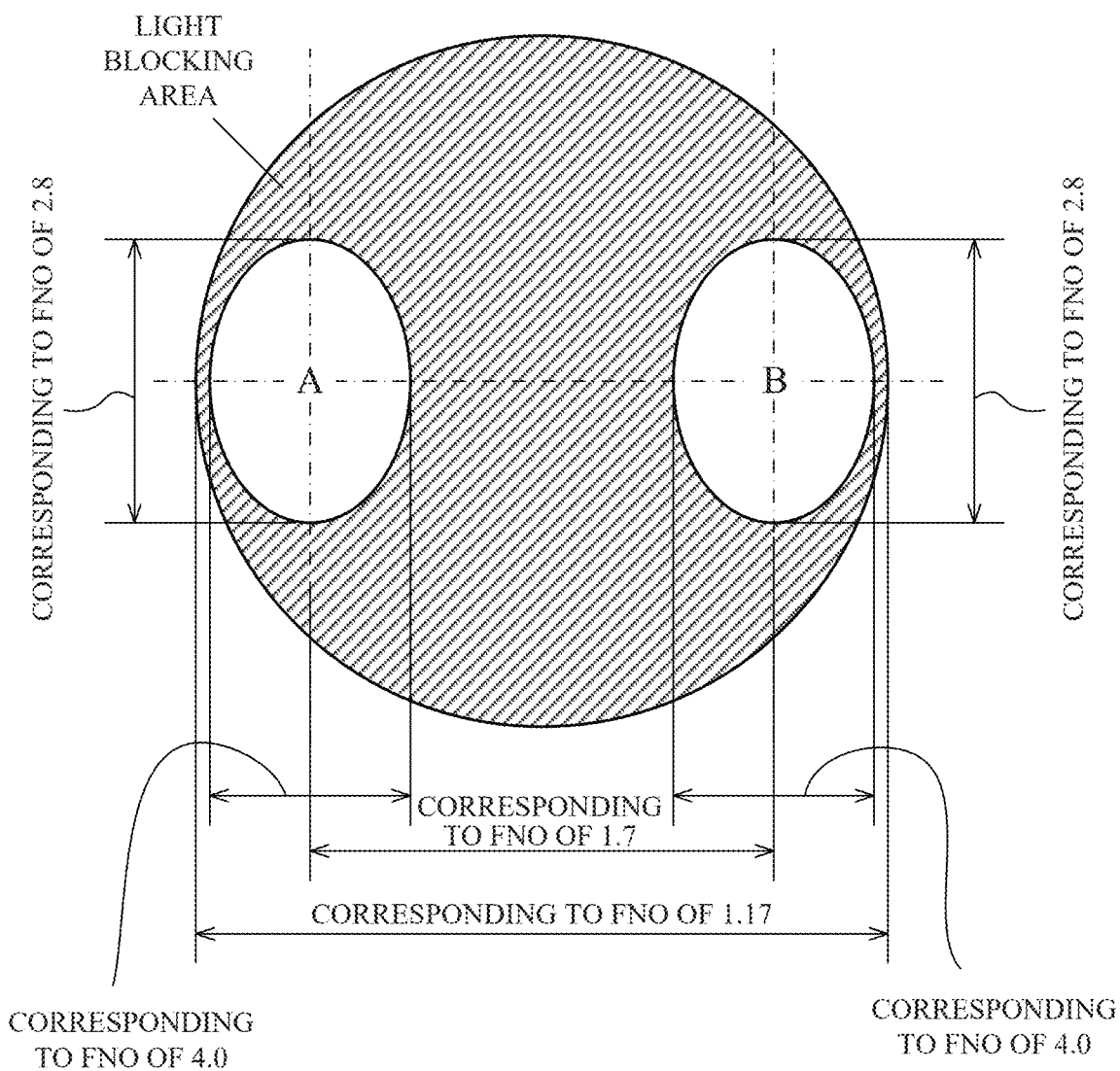
FIG. 8 is a schematic diagram illustrating a diaphragm of the optical system according to Example 4.

FIG. 8 is a schematic diagram of the diaphragm S4 in the optical system 1d. The diaphragm S4 is not a general diaphragm having a circular aperture, but has a shape in which two elliptical holes are formed on a light-blocking member. A distance between the holes corresponds to an Fno of 1.7. Vertical sizes of the two holes correspond to an Fno of 2.8 and horizontal sizes of the two holes corresponds to an Fno of 4.0. As a result, a pupil is divided into two parts. On the diaphragm S4 according to this example, two elliptical holes A and B are arranged in the horizontal direction on the light-blocking member, but they may be tilted and arranged in the vertical direction as needed.

In a case where the optical system 1d according to this example is used as a distance measuring optical system, an image sensor (image pickup plane phase difference sensor) is disposed on the image plane IM4 that can perform photoelectric conversion while distinguishing between incident light beams from the two elliptical holes A and B on the light-blocking member. Such an image sensor, the optical system 1d according to this example, and a processing unit described below can configure a distance measuring apparatus such as an in-vehicle camera.

If an object is located on a front focal plane of the optical system 1d according to this example, two divided light beams form images whose positions are not shifted on the image plane of the optical system 1d. On the other hand, if an object is located at a position other than a position on the front focal plane of the optical system 1d, the two divided light beams form images whose positions are shifted. In this case, the shift of the positions of the images respectively formed by the light beams corresponds to a displacement amount of the object from the front focal plane. Therefore, a distance to the object can be measured by acquiring an amount and a direction of the shift of the positions of the images respectively formed by the light beams.

Tables 9 and 10 provide numerical values regarding the inequalities according to Examples 1 to 4. In Table 9, Np3 represents a refractive index of the positive lens L16 or L36 closest to the image side in the second cemented lens, Nsub1 represents |Np1−Nn1|, and Nsub2 represents |Np2−Nn2|.

TABLE 9

|  | FIRST CEMENTED LENS | | | SECOND CEMENTED LENS | | | |
|---|---|---|---|---|---|---|---|
|  | Nn1 | Np1 | Nsub1 | Np2 | Nn2 | Np3 | Nsub2 |
| EXAMPLE 1 | 1.85478 | 1.95906 | 0.10428 | 1.743 | 1.893 | 1.816 | 0.15 |
| EXAMPLE 2 | 1.85478 | 1.95906 | 0.10428 | 1.816 | 1.893 | — | 0.077 |
| EXAMPLE 3 | 1.85478 | 1.92286 | 0.06808 | 1.743 | 1.808 | 1.883 | 0.065 |
| EXAMPLE 4 | 1.85478 | 1.95906 | 0.10428 | 1.743 | 1.893 | 1.816 | 0.15 |

TABLE 10

|  | f | |RA/RB| | fn1 | fp1 | fp2 | fn2 |
|---|---|---|---|---|---|---|
| EXAMPLE 1 | 5 | 1.10 | −2.16 | −1.06 | 0.94 | 1.45 |
| EXAMPLE 2 | 5 | 0.95 | −2.51 | −1.01 | 1.29 | 1.42 |
| EXAMPLE 3 | 5 | 1.11 | −1.67 | −0.94 | 0.82 | 1.06 |
| EXAMPLE 4 | 5.6 | 1.04 | −1.84 | −1.12 | 0.83 | 1.32 |

The optical system according to each example can provide high imaging performance while the cemented lens is hindered from separating and cracking even when a large temperature change occurs.

Figure 9:
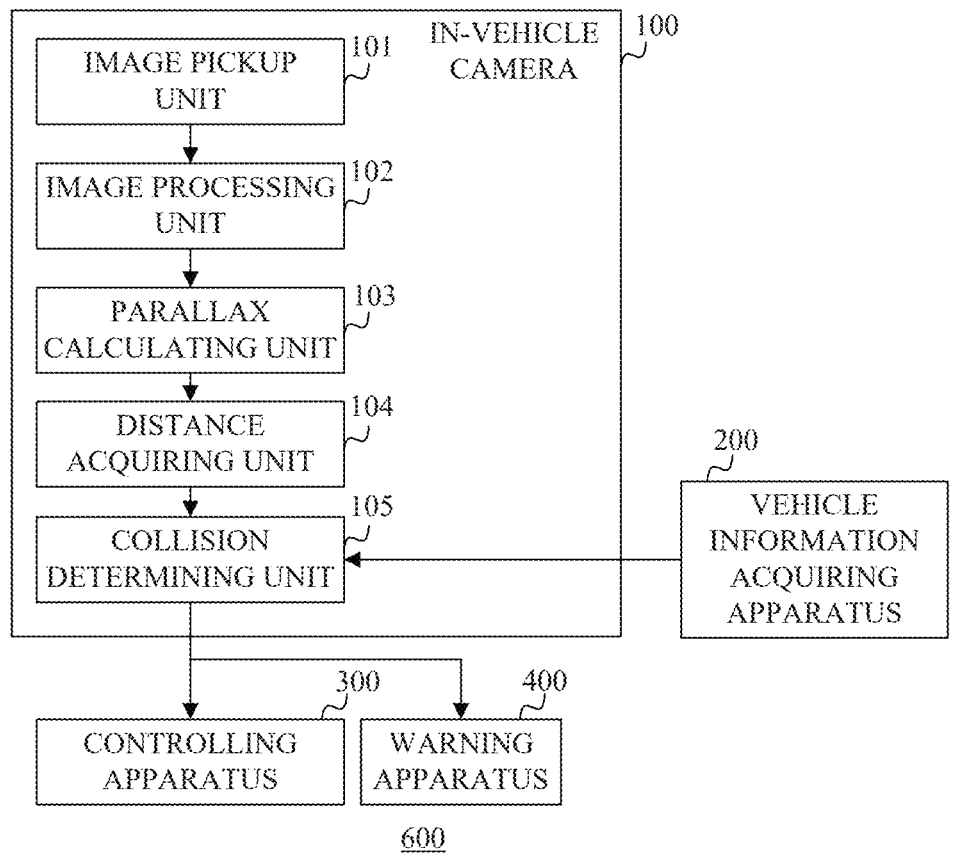
FIG. 9 is a block diagram illustrating an in-vehicle system including the optical system according to each example.
Figure 10:
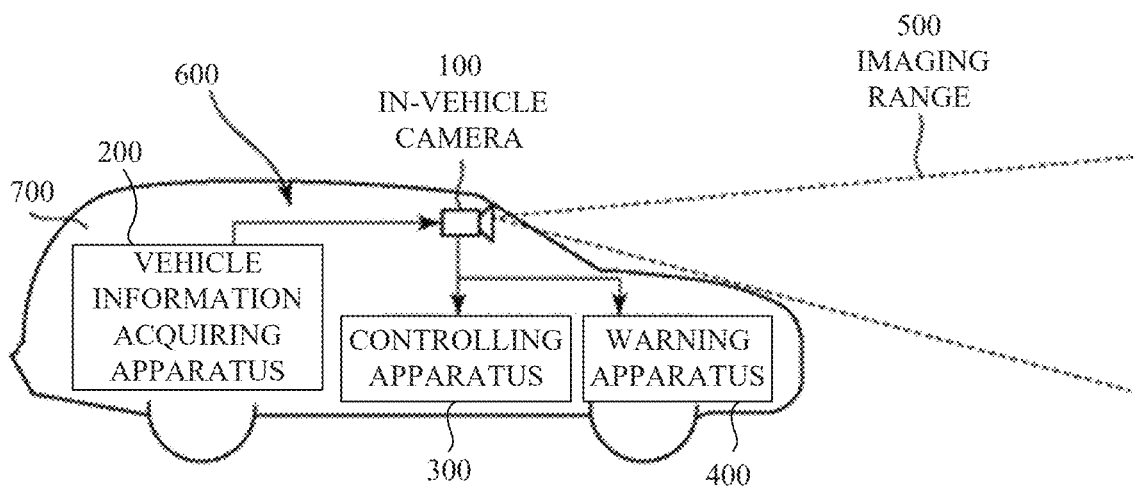
FIG. 10 is a schematic diagram illustrating a main part of a vehicle including the optical system according to each example.
Figure 11:
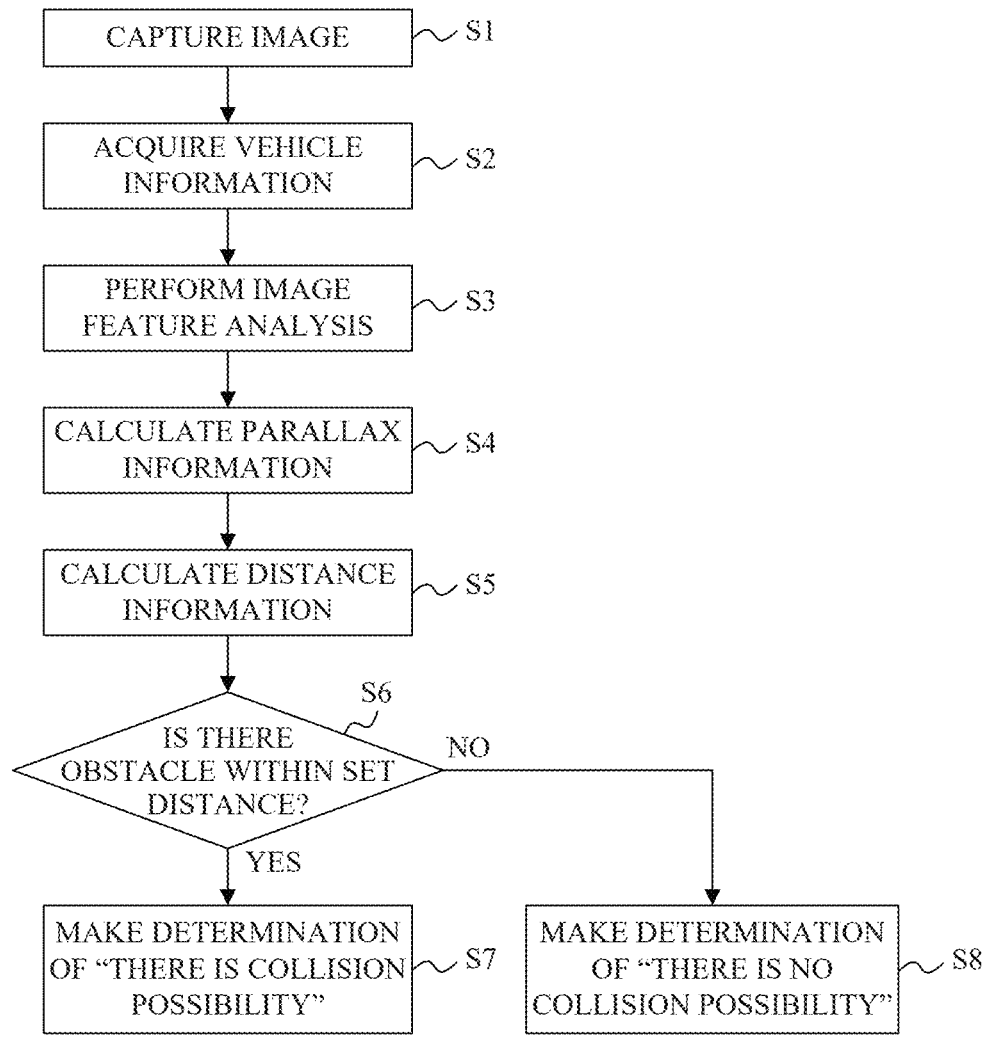
FIG. 11 is a flowchart illustrating an operation example of the in-vehicle system including the optical system according to each example.

Next, with reference to FIGS. 9 to 11, a description is given of an in-vehicle camera 100 including the optical system (optical apparatus, system) according to each example and an in-vehicle system (driving supporting apparatus) 600 including the in-vehicle camera 100. FIG. 9 is a block diagram illustrating the in-vehicle camera 100 and the in-vehicle system 600 including the in-vehicle camera 100. The in-vehicle system 600 is held by a moving body (moving apparatus) such as a car (vehicle) and is a system to support driving (handling or controlling) of the vehicle based on image information around the vehicle acquired by the in-vehicle camera 100. FIG. 10 is a schematic diagram illustrating a vehicle 700 as a moving apparatus including the in-vehicle system 600. FIG. 10 illustrates a case where an imaging range 500 of the in-vehicle camera 100 is set in a front direction of the vehicle 700, but the imaging range 500 may be set in a rear direction or in a lateral direction of the vehicle 700.

As illustrated in FIG. 7, the in-vehicle system 600 includes the in-vehicle camera 100, a vehicle information acquiring apparatus 200, a controlling apparatus (control unit, electronic control unit (ECU)) 300, and a warning apparatus (warning unit) 400. The in-vehicle camera 100 includes an image pickup unit (image pickup apparatus) 101, an image processing unit 102, a parallax calculating unit 103, a distance acquiring unit (acquiring unit) 104, and a collision determining unit 105. A processing unit includes the image processing unit 102, the parallax calculating unit 103, the distance acquiring unit 104, and the collision determining unit 105. The image pickup unit 101 includes the optical system according to any of the above-described examples and an image sensor (image pickup plane phase difference sensor, sensor).

FIG. 11 is a flowchart illustrating an operation example of the in-vehicle system 600 according to this embodiment. Hereinafter, a description is given of an operation of the in-vehicle system 600 with reference to this flowchart.

First, in step S1, the image pickup unit 101 images a target object (object) such as an obstacle or a pedestrian around the vehicle, and acquires a plurality of pieces of image data (parallax image data).

In step S2, the vehicle information acquiring apparatus 200 acquires vehicle information. The vehicle information is information including a vehicle speed, a yaw rate, a steering angle, and the like of the vehicle.

In step S3, the image processing unit 102 performs image processing on the plurality of pieces of image data acquired by the image pickup unit 101. Specifically, the image processing unit 102 performs image feature analysis that analyzes feature amounts including an edge amount, an edge direction, a density value, and the like of image data. Here, the image feature analysis may be performed on each of the plurality of pieces of image data, or may be performed on a part of the plurality of pieces of image data.

In step S4, the parallax calculating unit 103 calculates parallax (image shift) information between the plurality of pieces of image data acquired by the image pickup unit 101. As a method for calculating the parallax information, a known method such as an SSDA method or an area correlation method can be used, and hence a description thereof is omitted in this embodiment. Steps S2, S3, and S4 may be performed in the above-described order, or the processing therein may be performed in parallel with each other.

In step S5, the distance acquiring unit 104 acquires (calculates) distance information with respect to the target object imaged by the image pickup unit 101. The distance information can be calculated based on the parallax information calculated by the parallax calculating unit 103 and an internal parameter and an external parameter of the image pickup unit 101. The distance information is information on a relative position with the target object such as a distance from the target object, a defocus amount, an image shift amount, or the like, and may directly represent (express or indicate) a distance value to the target object in the image or may indirectly represent (express or indicate) information corresponding to the distance value.

Thereafter, in step S6, the collision determining unit 105 determines whether or not the distance to the target object is within a range of a preset set distance, by using the vehicle information acquired by the vehicle information acquiring apparatus 200 and the distance information calculated by the distance acquiring unit 104. Thereby, it is possible to determine whether or not the target object is located within the set distance around the vehicle, and to determine a collision possibility between the vehicle and the target object. If the target object is located within the set distance, the collision determining unit 105 makes a determination of "there is a collision possibility" (step S7), and if the target object is not located within the set distance, the collision determining unit 105 makes a determination of "there is no collision possibility" (step S8).

Next, if the collision determining unit 105 has made the determination of "there is a collision possibility", the collision determining unit 105 notifies the controlling apparatus 300 and the warning apparatus 400 of the determination result (transmits the determination result to the controlling apparatus 300 and the warning apparatus 400). In this case, the controlling apparatus 300 controls the vehicle based on the determination result from the collision determining unit 105 (step S6), and the warning apparatus 400 warns a vehicle user (driver or passenger) based on the determination result from the collision determining unit 105 (step S7). The determination result may be notified to at least one of the controlling apparatus 300 and the warning apparatus 400.

The controlling apparatus 300 can control a movement of the vehicle by outputting a control signal to a driving unit (engine, motor, etc.) of the vehicle. For example, the controlling apparatus 300 provides, on the vehicle, control such as applying the brakes, releasing an accelerator, turning a steering wheel, and generating a control signal to generate a braking force on each wheel and to reduce output of the engine or a motor. The warning apparatus 400 warns the user by, for example, emitting a warning sound (alarm), displaying warning information on a screen of a car navigation system, or vibrating a seat belt or the steering wheel.

Figure 12:
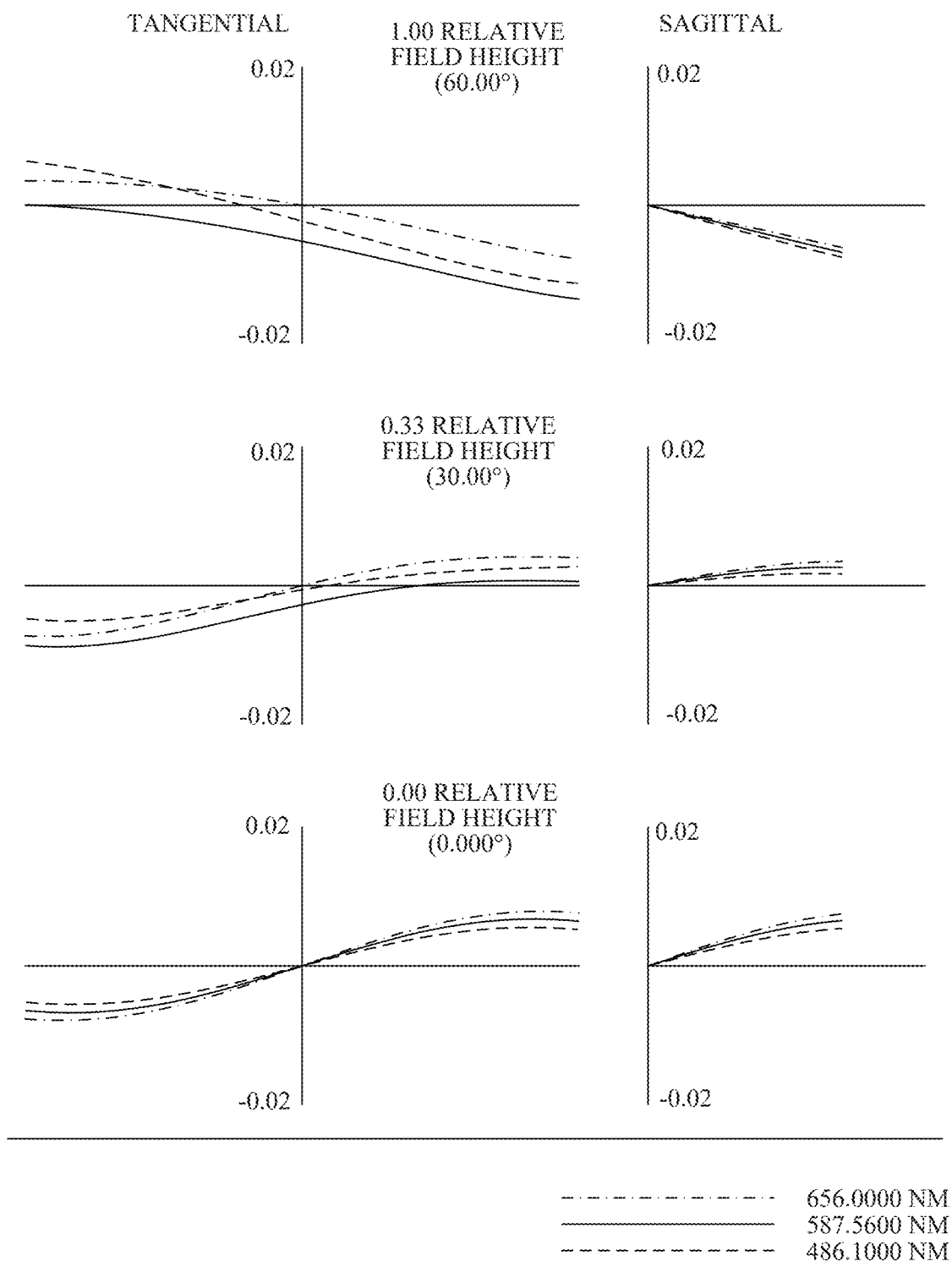
FIG. 12 is a lateral aberration diagram of the optical system according to Example 4.

FIG. 12 is a lateral aberration diagram of the optical system 1d. FIG. 12 illustrates lateral aberrations at a C-line (wavelength 656.3 nm), a d-line (wavelength 587.6 nm), and an F-line (wavelength 486.1 nm) in three angle of views of the optical system 1d, and a unit of each numerical value is mm. As illustrated in FIG. 12, field curvature, chromatic aberration, etc. are corrected well. An aperture ratio (vignetting) of the optical system 1d is 100% at every angle of view, and thus a bright optical system can be realized from on-axis to the off-axis.

As described above, the in-vehicle system 600 according to this embodiment can effectively detect the target object by the above-described processing and can avoid the collision between the vehicle and the target object. In particular, in a case where the optical system according to any of the above-described examples is applied to the in-vehicle system 600, the in-vehicle system 600 can detect the target object and determine the collision possibility over a wide angle of view, while the entire in-vehicle camera 100 is made small and is placed with an increased degree of freedom.

In this embodiment, a description is given of the configuration in which the in-vehicle camera 100 includes one image pickup unit 101 including the image pickup plane phase difference sensor, but the configuration is not limited to this, and as the in-vehicle camera 100, a stereo camera including two image pickup units may be used. In this case, even when the image pickup plane phase difference sensor is not used, the image data is acquired simultaneously by each of the two synchronized image pickup units, and processing similar to the above-described processing can be performed by using the two pieces of image data. If a difference in imaging time between the two image pickup units is known, it is not necessary to synchronize the two image pickup units.

There are various embodiments of the calculation of the distance information. As an example, a description is given of a case of using, as the image sensor of the image pickup unit 101, a pupil division type image sensor (light receiving unit) including a plurality of pixel units regularly arranged in a two-dimensional array. In the pupil division type image sensor, one pixel unit includes a microlens and a plurality of photoelectric conversion units, and can receive a pair of light beams passing through different areas in the pupil of the optical system and output paired image data from each photoelectric conversion unit.

An image shift amount of each area is calculated by correlation calculation between the paired image data, and the distance acquiring unit 104 calculates image shift map data representing a distribution of the image shift amounts. Alternatively, the distance acquiring unit 104 may further convert the image shift amount into a defocus amount and thereafter generate defocus map data representing a distribution of the defocus amounts (distribution of captured images on a two-dimensional plane). Alternatively, the distance acquiring unit 104 may acquire a distance map data representing the distance from the target object converted from the defocus amount.

The in-vehicle system 600 and the vehicle 700 may include notification apparatus (notification unit) for notifying a manufacturer (maker) of the in-vehicle system, a distributor (dealer) of the moving apparatus, or the like, in an unlikely event of a collision between the vehicle 700 and an obstacle. For example, the notification apparatus may be an apparatus that transmits information on the collision between the vehicle 700 and the obstacle (collision information) to a preset external notification destination by e-mail or the like.

Thus, in a case where a configuration is such that the notification apparatus automatically notifies the notification destination of the collision information, it is possible to promptly take measures such as an inspection and a repair after the collision occurs. The notification destination of the collision information may be an insurance company, a medical institution, the police, etc., or an arbitrary destination set by the user. The notification apparatus may be configured to notify the notification destination of not only the collision information but also failure information on each part and consumption information on a consumable part. Whether or not a collision occurs may be detected by using the distance information acquired based on the output from the light receiving unit described above, or by another detector (sensor).

In this embodiment, the in-vehicle system 600 is applied to the driving support (reduction of collision damage), but the present disclosure is not limited to this, and the in-vehicle system 600 may be applied to cruise control (including cruise control with all speed tracking function) and automated cruise. The in-vehicle system 600 can be applied not only to a vehicle such as an automobile but also to a moving body such as a ship, an aircraft, and an industrial robot. The in-vehicle system 600 can be applied not only to the moving bodies but also to various devices that utilize object recognition such as the Intelligent Transport Systems (ITS).

In the above-described embodiment, a description is given of the case where the optical system is applied to the image pickup unit in the in-vehicle system, but the present disclosure is not limited to this. For example, the optical system may be applied to an image pickup apparatus such as a digital still camera, a digital video camera, and a silver halide camera, may be applied to an optical device such as a telescope, and may be applied to a projection apparatus such as a projector.

According to each example, it is possible to provide an optical system, an image pickup apparatus, an in-vehicle system, and a moving apparatus each of which has high imaging performance while a linear expansion difference is reduced in a cemented lens.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-143924, filed on Sep. 3, 2021, which is hereby incorporated by reference herein in its entirety.

What is claimed is:

1. A system comprising:
an aperture diaphragm;
a first lens configured to be disposed next to the aperture diaphragm on an object side, and to include one or more positive lenses and one or more negative lenses; and
a second lens configured to be disposed next to the aperture diaphragm on an image side, and to include one or more positive lenses and one or more negative lenses,
wherein following inequalities are satisfied:

$1.70 < Np1 < 2.10$ $1.70 < Np2 < 2.10$ $1.80 < Nn1 < 2.10$ $1.80 < Nn2 < 2.10$ $0.068 \leq |Np1 - Nn1| < 0.18$ $0.065 \leq |Np2 - Nn2| < 0.18$ $-4.0 < f1/f < -1.0$ $-2.000 < fn1/f < -0.001$ $0.001 < fp1/f < 2.000$ where Np1 represents a refractive index of a first positive lens closest to the aperture diaphragm in the one or more positive lenses of the first lens, Nn1 represents a refractive index of a first negative lens closest to the aperture diaphragm in the one or more negative lenses of the first lens, Np2 represents a refractive index of a second positive lens closest to the aperture diaphragm in the one or more positive lenses of the second lens, Nn2 represents a refractive index of a second negative lens closest to the aperture diaphragm in the one or more negative lenses of the second lens, f represents a focal length of the system, f1 represents a focal length of a lens closest to the object side in the system, fp1 represents a focal length of the first positive lens, and fn1 represents a focal length of the first negative lens.

2. The system according to claim 1, wherein a following inequality is satisfied:

$$0.85 < |RA/RB| < 1.30$$

where RA represents a curvature radius of each of a surface of the first positive lens and a surface of the first negative lens that are cemented to each other, and RB represents a curvature radius of each of a surface of the second positive lens and a surface of the second negative lens that are cemented to each other.

3. The system according to claim 1, wherein following inequalities are satisfied:

$$-2.500 < fn2/f < -0.001$$

$$0.001 < fp2/f < 2.500$$

where fp2 represents a focal length of the second positive lens, and fn2 represents a focal length of the second negative lens.

4. The system according to claim 1, further comprising:
a negative lens disposed next to the first lens on the object side; and
a positive lens disposed next to the second lens on the image side.

5. The system according to claim 1, wherein the first negative lens is disposed on an object side of the first positive lens, and the second positive lens is disposed on an object side of the second negative lens.

6. The system according to claim 1, wherein a focal length of the system does not change.

7. The system according to claim 6, wherein all lenses constituting the system are always fixed.

8. The system according to claim 1, wherein a following inequality is satisfied:

$$1.5 < D1/D0 < 15.0$$

where D0 represents an effective diameter of the first negative lens or the second negative lens, and D1 represents an outer diameter of the at least one.

9. The system according to claim 8, wherein D0 represents an effective diameter of the first negative lens, and D1 represents an outer diameter of the first negative lens.

10. The system according to claim 8, wherein D0 represents an effective diameter of the second negative lens, and D1 represents an outer diameter of the second negative lens.

11. The system according to claim 8, wherein an effective diameter of the first negative lens is smaller than an effective diameter of the second negative lens.

12. The system according to claim 8, wherein an effective diameter of the first negative lens is larger than an effective diameter of the second negative lens.

13. An image pickup apparatus comprising:
the system according to claim 1; and
a sensor configured to image an object via the system.

* * * * *